US012053781B2

(12) United States Patent
Anderson

(10) Patent No.: US 12,053,781 B2
(45) Date of Patent: Aug. 6, 2024

(54) SOLVENT RESERVOIR CONFIGURATION FOR STEADY FLOW AND MONITORING SOLVENT LEVEL AND DENSITY

(71) Applicant: Waters Technologies Corporation, Milford, MA (US)

(72) Inventor: Sean Eric Anderson, Dedham, MA (US)

(73) Assignee: Waters Technologies Corporation, Milford, MA (US)

( * ) Notice: Subject to any disclaimer, the term of this patent is extended or adjusted under 35 U.S.C. 154(b) by 0 days.

(21) Appl. No.: 18/459,997

(22) Filed: Sep. 1, 2023

(65) Prior Publication Data

US 2024/0017261 A1   Jan. 18, 2024

Related U.S. Application Data

(63) Continuation of application No. 17/340,287, filed on Jun. 7, 2021, now Pat. No. 11,786,904.

(60) Provisional application No. 63/036,657, filed on Jun. 9, 2020.

(51) Int. Cl.
| | | |
|---|---|---|
| *C12N 15/10* | (2006.01) | |
| *A61K 45/06* | (2006.01) | |
| *B01L 3/00* | (2006.01) | |
| *B01L 3/02* | (2006.01) | |
| *G01N 21/35* | (2014.01) | |
| *G01N 21/3504* | (2014.01) | |
| *G01N 21/64* | (2006.01) | |
| *G01N 33/00* | (2006.01) | |
| *G01N 33/50* | (2006.01) | |
| *G01N 33/53* | (2006.01) | |
| *G01N 33/543* | (2006.01) | |
| *G01N 33/574* | (2006.01) | |

(52) U.S. Cl.
CPC .......... *B01L 3/523* (2013.01); *B01L 2300/048* (2013.01); *B01L 2300/0663* (2013.01); *B01L 2300/14* (2013.01); *B01L 2400/0487* (2013.01); *B01L 2400/082* (2013.01)

(58) Field of Classification Search
CPC .............. B01L 3/523; B01L 2300/048; B01L 2300/0663; B01L 2300/14; B01L 2400/0487; B01L 2400/082; B01L 2200/146; B01L 2400/0457; B01L 3/52; G01N 2030/027
See application file for complete search history.

(56) References Cited

U.S. PATENT DOCUMENTS

| | | | |
|---|---|---|---|
| 2013/0187995 A1 | 7/2013 | Kobashi et al. | |
| 2013/0327787 A1* | 12/2013 | Koltay | G01F 11/029 222/61 |
| 2017/0216841 A1 | 8/2017 | Malkin et al. | |

* cited by examiner

*Primary Examiner* — Jennifer Wecker
*Assistant Examiner* — Oyeleye Alexander Alabi
(74) *Attorney, Agent, or Firm* — WOMBLE BOND DICKINSON (US) LLP; Deborah M. Vernon; John V. Forcier

(57) ABSTRACT

Disclosed herein are solvent reservoir systems for steady flow delivery and simultaneous monitoring of solvent level and solvent density within the solvent reservoir systems and methods for monitoring the solvent reservoir systems and providing feedback to a user or adjusting the systems in response to the monitored characteristics.

12 Claims, 4 Drawing Sheets

SOLVENT RESERVOIR CONFIGURATION FOR STEADY FLOW AND MONITORING SOLVENT LEVEL AND DENSITY

CROSS-REFERENCE TO RELATED APPLICATIONS

This application is a continuation of U.S. application Ser. No. 17/340,287, filed Jun. 7, 2021, and claims priority to U.S. Provisional Application No. 63/036,657, filed Jun. 9, 2020, entitled "SOLVENT RESERVOIR CONFIGURATION FOR STEADY FLOW AND MONITORING SOLVENT LEVEL AND DENSITY," which is hereby incorporated by reference herein in its entireties.

FIELD OF DISCLOSURE

This disclosure relates generally to a solvent reservoir system, and in particular, to systems and methods for monitoring a solvent level and a solvent density within the reservoir.

BACKGROUND

Generally, performance of sensitive laboratory equipment, such as liquid chromatography is affected by solvent head pressure changes and solvent volatility. For example, when delivering solvent from a reservoir via gravity, the flow rate changes with the solvent level. When the solvent level is high, the pressure head is high, and higher flows are delivered. As the level drops, so does the pressure head, and consequently, the flow. This has been a long-standing issue when consistent flows are desired from a gravity-fed system.

Additionally, solvent levels are often difficult to ascertain due to reservoir location and obstructions thereto, and current systems do not have any active feedback of solvent level or solvent density. Some systems may include crude means for accounting for expected solvent usage; however, they are typically not very accurate and insufficient or incorrect solvent can ruin a sample run.

In liquid chromatography, for example, a pump is used to provide a flow of solvent to the chromatography system. The solvent composition is often carefully proportioned and mixed by the pump. Liquid chromatography pumps tend to operate via positive-displacement principles, which control the intake volume based on volumetric displacement. However, the fluidic path from solvent supply to the pump includes some compliance, inertance, and active valves; and the flow characteristics can change if there are differences in solvent properties or in the head pressure of the solvent bottles. As the solvent in the bottle is depleted, the head pressure changes overtime, which can cause slight differences in its delivery to the system. This effect is especially egregious when the solvent bottles are located closer to the pump (in the vertical direction), since the change in the pressure head due to the solvent height constitutes a greater percentage of the total pressure head. This may also be a factor with denser solvents. Many liquid chromatography methods are sensitive to slight changes in the delivered composition, which can cause undesired shifts in retention time.

An additional problem faced in liquid chromatography is the monitoring of how much solvent is available to the system. Traditional liquid chromatography systems do not incorporate any kind of feedback mechanism to monitor solvent levels. While the pumps used in liquid chromatography systems are highly precise and can be used to estimate the required amount of solvent, it can be difficult for the user to confirm that they have the necessary amount to complete a method set, and a poor estimate can cause solvent to run out before a process is complete. In particular, the solvent bottle tray is often above eye level and can have many factors obstructing the level of the liquid. Even if the necessary amount of solvent is confirmed and available, if there is a leak in the system, solvent consumption may be greater than expected, resulting in a similar problem. Certain solvents may also be consumed at more variable rates. For example, the seal wash pump is typically less precise and will have more variability in consumption. In some cases, the user may prepare more solvent than required to ensure they do not run out, which can add additional cost and complexity for the user. For example, there may be more solvent waste due to expiration of solvent and the bottle tray may be more crowded due to the larger bottles.

SUMMARY

Generally, the invention is directed to a solvent reservoir system for steady flow delivery and simultaneous monitoring of solvent level and density. The disclosed systems and methods address the problems described above. A reservoir configuration is disclosed that uses a passive mechanism to stabilize the head pressure in the reservoir, which results in the internal pressure of the solvent reservoir varying with the solvent height in a simple and predictable manner. By incorporating a pressure sensor to measure the pressure differential between the interior and exterior of the reservoir, the solvent level can be calculated and used as feedback to the system or user to, for example, trigger alerts, generate error messages, or pause/stop a process when the solvent level drops too low or at an unexpected rate, or the solvent composition has changed.

In one aspect, the disclosure is related to a reservoir system for providing a solvent to, for example, various types of sensitive laboratory equipment, such as high pressure liquid chromatography (high performance liquid chromatography (HPLC), ultra-high-performance liquid chromatography (UHPILC), and ultra-performance liquid chromatography (UPLC). The system includes a reservoir configured for holding the solvent, an inlet tube sealingly coupled to the reservoir, an outlet tube sealingly coupled to the reservoir, and a pressure sensor sealingly coupled to the reservoir. The pressure sensor may be configured to sense at least one of an internal pressure (e.g., a gas pressure within the reservoir) or an external pressure (e.g., the ambient atmospheric pressure surrounding the reservoir) of the reservoir and typically measures both.

In another aspect, the disclosure relates to a method of controlling a reservoir system, such as those described herein. The method includes providing a reservoir system, measuring an internal pressure of the reservoir, measuring an external pressure of the reservoir, determining a characteristic of the reservoir system (e.g., solvent level or density) based, for example, on the measured pressures and/or known physical aspects of the reservoir system (e.g., those described herein below), and outputting a control signal to the reservoir system based on the determined characteristic. Generally, the characteristic can be determined by calculating at least one of the solvent level and/or solvent density based on the measured data in accordance with one or more of the equations disclosed below. The reservoir system includes a reservoir configured for holding a solvent, an inlet tube sealingly coupled to the reservoir, an outlet tube sealingly coupled to the reservoir, and a pressure sensor sealingly coupled to the reservoir. The method may also include the step of generating a response to the control signal, such as triggering an alert (e.g., notifying a user that a passive physical change to the system is required, such as a need for a larger inlet tube), generating a message (e.g., an error message or a system condition message, such as volume remaining or remaining run time, etc.), stopping or pausing the laboratory process, initiating a refill of the reservoir, regulating the pressure of the inlet line, or altering a position of the reservoir (e.g., raising the reservoir relative to the laboratory process). Additionally, the step of determining a characteristic of the reservoir system comprises generating a signal corresponding to at least one of a solvent level or a solvent density. Additional sensors or sensor configurations may be included for measuring, for example, temperature and external pressure. In certain embodiments, the system tracks temperatures and external pressures to obtain more accurate internal pressure measurements. In some embodiments, the pressure sensor measures a pressure differential between the internal and external pressure (external pressure being a reference) to determine a characteristic of the reservoir system. Additionally, some pressure sensors may be configured to compensate for ambient temperature and remain accurate.

In various embodiments of the foregoing aspects, the reservoir is air-tight and may be a Mariotte (or Marriotte's) bottle, where any unused ports are sealed off. The inlet tube, the outlet tube, and the pressure sensor may be coupled to the reservoir via a common structure, such as a cap or other fitting. In some embodiments, the reservoir is pressurized, for example, with a particular gas that is unreactive with the solvent in the reservoir. In some embodiments, a diaphragm is disposed between the pressure sensor and an interior of the reservoir to, for example, protect the sensor from any corrosive or otherwise destructive vapors within the reservoir. The pressure sensor is configured to measure air pressure and may include one or more pressure transducers (e.g., one for measuring internal pressure and one for measuring external pressure).

Additionally, the system may include a controller or processor for processing one or more signals generated by the pressure sensor and controlling one or more functions of the reservoir system, such as triggering an alert, generating a message (e.g., an error message or a system condition message, such as volume remaining or remaining run time, etc.), stopping or pausing the laboratory process, initiating a refill of the reservoir, regulating the pressure of the inlet line, or altering a position of the reservoir (e.g., raising the reservoir relative to the laboratory process). In some embodiments, and in some cases depending on the geometry of the different components of the reservoir system, the controller may apply a correction factor to the generated data to account for the Laplace pressure effect. Alternatively or additionally, the controller may notify a user to alter the geometry of one of the components of the reservoir system, such as, for example, changing the size and/or geometry of the inlet tube at the air/liquid interface render the Laplace effect negligible.

In still further embodiments, the system includes a pumping system in fluid communication with the reservoir via the outlet tube. In some cases, the pumping system is a highly sensitive and precise system for metering the solvent to the laboratory process. In various embodiments, the inlet tube may include an outlet port positioned proximate a bottom area of the reservoir and an inlet port, where the inlet tube is configured to allow a gas to enter the reservoir. In some embodiments, the inlet port of the inlet tube is in fluid communication with at least one of ambient atmosphere or a remote gas source, such as, for example, a pressurized source of a gas that is compatible with the solvent. In certain embodiments, the outlet port of the inlet tube may be flared or have a specific geometry optimized to reduce or eliminate the Laplace pressure effect, which may eliminate the need for applying a correction factor to the generated data. In some embodiments, the outlet tube includes an inlet port positioned proximate the bottom area of the reservoir and configured draw in the solvent when a negative pressure is applied to the outlet tube (e.g., via the pumping system). In some embodiments, a sinker (or other weighted structure may be included proximate the inlet port to maintain its position within the reservoir. The inlet port may also include a filter. The outlet tube may also include an outlet port in fluid communication with a pumping system via, for example, a combination of fittings, tubing, and/or valving.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Accordingly, these and other objects, along with advantages and features of the present disclosure herein disclosed, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the disclosure and are not intended as a definition of the limits of the disclosure. For purposes of clarity, not every component may be labeled in every drawing. In the following description, various embodiments of the present disclosure are described with reference to the following drawings, in which.

DETAILED DESCRIPTION

Figure 1:
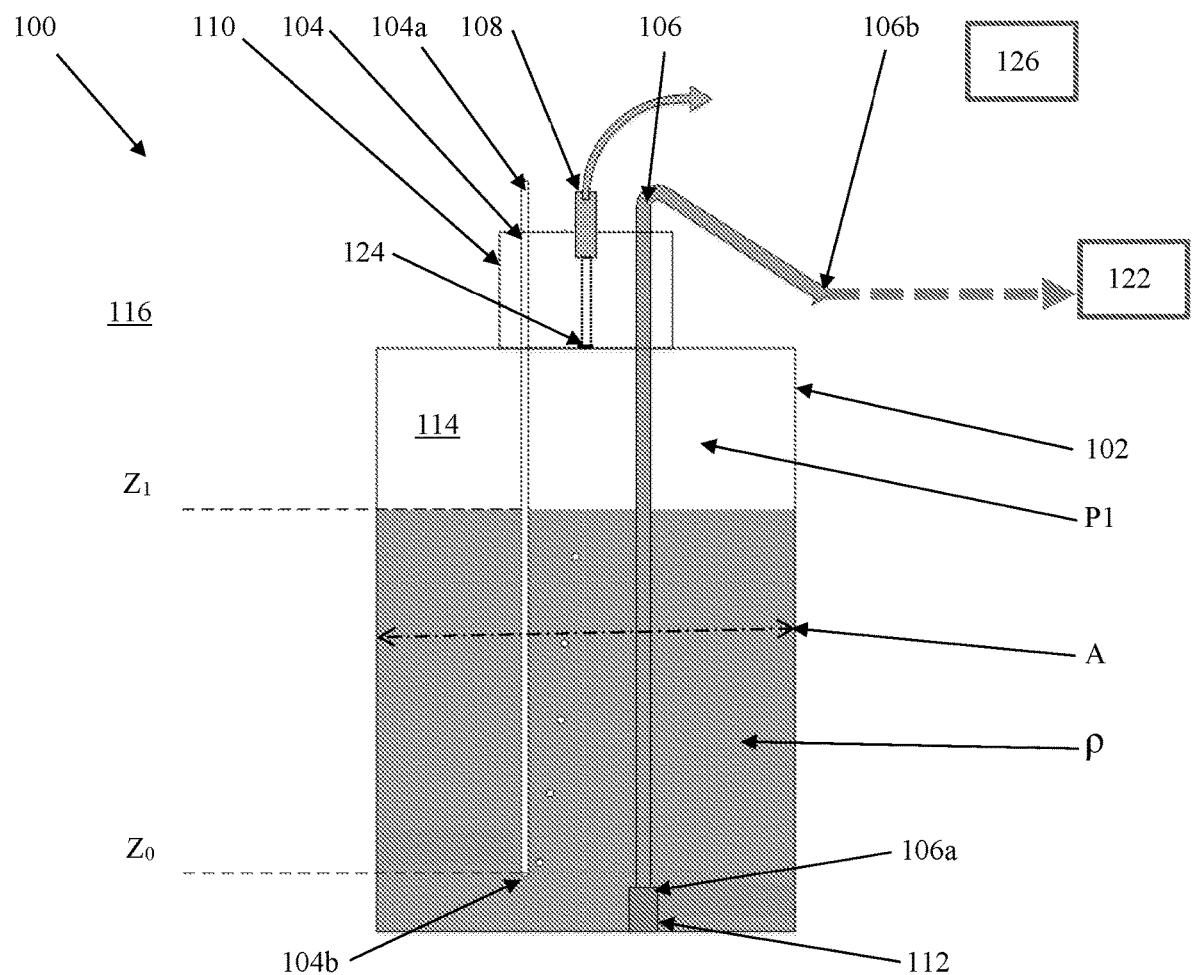
FIG. 1 is a schematic view of a reservoir system in accordance with one or more embodiments of the disclosure.

Reference will now be made to the exemplary embodiments illustrated in the drawings, and specific language will be used here to describe the same. It will nevertheless be understood that no limitation of the scope of the disclosure is thereby intended. Alterations and further modifications of the inventive features illustrated herein, and additional applications of the principles of the disclosure as illustrated herein, which would occur to one skilled in the relevant art and having possession of this disclosure, are to be considered within the scope of the disclosure.

FIG. 1 depicts one embodiment of a reservoir system 100 that may be used with sensitive laboratory equipment, such as those that rely on the delivery of precisely metered solvents. As shown in FIG. 1, the system includes a reservoir 102, such as a Mariotte bottle configuration, with an inlet tube 104, an outlet tube 106, and a pressure sensor 108 coupled thereto. In some embodiments, the Mariotte bottle configuration is helpful to stabilize the head pressure in the reservoir. In the embodiment shown in FIG. 1, the tubes 104, 106 and the pressure sensor 108 are coupled to the reservoir 102 via a cap 110 and an air-tight seal. The size, shape, and material of the reservoir 102 may vary to suit a particular application (e.g., volume of solvent required for a given process and/or composition of the solvent). In some embodiments, the reservoir 102 is made from a glass or polymeric material and has a volume of about 10 mL to about 20,000 mL. The reservoir can have a substantially circular or square cross section to suit a particular application. It is also possible for the reservoir 102 to have a non-uniform cross section provided that its geometry is known (e.g., cross section as a function of height). The reservoir will typically have one or more threaded openings configured to accept, for example, standard GL-35 or GL 45 caps with ¼-28 threaded ports; however, other ports sizes and configurations are contemplated and considered within the scope of the invention. In turn, the cap may include a series of openings or ports for sealingly engaging with the tubes 104, 108 and the pressure sensor 108.

Generally, the inlet and outlet tubes 104 106 are in fluid communication with an interior 114 of the reservoir 102 and an exterior environment 116 about the reservoir. In some embodiments, the outlet tube 106 may be in fluid communication with a pump system 122 as opposed to the external environment 116. Specifically, an inlet end or port 104a (in some embodiments, the inlet includes a fitting and/or a valve arrangement that can be coupled to an alternative gas source) of the inlet tube 104 that is open to the environment 116 and allows air to be drawn into the reservoir 102 via an outlet port 104b under certain conditions as discussed below. In some embodiments, the gas is air at atmospheric pressure; however, in other embodiments, an alternative gas may be used to avoid oxidation of certain solvents and/or to control gas dissolution. In some embodiments, the inlet port 104a is fluidly coupled to a pressure bottle to, for example, regulate pressure to compensate for fluid density differences and/or ambient temperature and control the pressure head of the reservoir.

The outlet 104b port of the inlet tube 104 is disposed proximate a bottom area of the reservoir 102 (position $Z_O$). Similarly, the outlet tube 106 can have an inlet end 106a disposed proximate or adjacent to the bottom of the reservoir 102, which may include a sinker 112 (to maintain the position of the inlet 106a) and/or a filter to prevent any contaminants from entering the outlet tube 106 along with the solvent 120. In some cases, the sinker 112 may be fixed relative to the inlet tube to provide consistency of performance. The solvent 120 is discharged from the outlet end 106b of the outlet tube 106. Typically, the solvent is drawn out via the pumping system 122 or gravity. The size, material, and length of the tubes 104, 106 will vary to suit a particular application. In some embodiments, the inlet tube 104 is about ¹⁄₁₆ inch in diameter to about ¼ inch in diameter. In some embodiments, the outlet tube 106 is about ¼ inch in diameter to about ½ inch in diameter. In some embodiments, the gas inlet tube 104 may include a check valve (not shown) to prevent the escape of solvent vapors. The tubes 104, 106 may be made of a polymeric or stainless steel material (e.g., 316 SS), or other solvent-compatible materials such as MP35N, Titanium, glass, or ceramics.

In various embodiments, the pressure sensor 108 may include one or more pressure transducers used to monitor the gas pressure in the reservoir 102 and provide feedback relative to the solvent density and/or the solvent level. The pressure sensor 108 is used to measure the internal pressure of the reservoir 102, which changes in a predictable manner with respect to the solvent level. The sensor 108 is not submerged within the solvent and, in certain embodiments, is separated from the interior 116 of the reservoir 102 via a diaphragm 124 to protect the sensor 108 from, for example, corrosive vapors created by the solvent 120. This configuration allows for gas pressure transducers to be used, which are less costly, easier to integrate, and would have better sensitivity than a liquid pressure sensor that may need to be submerged. The data generated via the pressure sensor 108 may be transmitted to a controller or processor 126 that may be configured to control the operation of the reservoir system 100, and in some cases, the experimental process incorporating the reservoir system 100. Examples of processors are described below.

The Mariotte bottle configuration relates to the use of a container of liquid that has a one or more liquid outlets 106 and at least one gas inlet tube 104. The gas inlet tube 104 is typically exposed to atmospheric pressure at one end, and the other end is submerged in the solvent. The bottle/reservoir 102 is otherwise completely sealed and airtight. As liquid is drawn out of the bottle, a slight vacuum is generated in the bottle that causes gas (typically air) to be drawn into the reservoir 102 through the inlet tube 104 due to the pressure differential. Once enough gas is drawn in, the gas will reach the end of the inlet tube 104 and bubble out into the solution/reservoir. At this point, the pressure at the outlet 104b of the gas inlet tube 104 must be exactly balanced against atmospheric pressure, and a stable dynamic equilibrium is reached where that pressure at that height remains fixed, so long as the air/liquid interface is at the end of the tube. This stabilizes the pressure at all other points within the solvent 120. As more solvent is drawn out, more air is drawn in, which relieves some of the vacuum in the reservoir and the pressure differential in the gas perfectly compensates for the pressure differential due to the solvent level changing. The Mariotte bottle configuration will operate as expected so long as the gas inlet tube is submerged in the solvent 120. When the solvent level drops below the gas inlet tube 104, the pressure in the reservoir 102 will equilibrate with atmospheric and the head pressure of the liquid will again change with solvent level.

In addition to passively stabilizing the pressure head within the reservoir, the disclosed systems can be used for monitoring the solvent level in the reservoir 102. Since the operating principle of a Mariotte bottle relies on the gas/vapor pressure in the bottle changing to compensate for the solvent level, by measuring that pressure, one can calculate the level of the solvent relative to the end of the inlet tube ($Z_O$) if its density ($\rho$) is known. If the density is unknown, it can be calculated from a simple calibration of applying a steady flow and measuring the pressure change over time if the cross sectional area of the reservoir (A) is known. For example, where the flow rate and bottle geometry are known, the density can be calculated for auto-calibration or for checking if it matches the expected solvent density. If the density (ρ) is known, the cross sectional area (A) of the reservoir 102 can be calculated instead to quickly calibrate for an unknown reservoir size. These relationships are captured in equations {1} and {2} below. If a reservoir does not have a uniform cross sectional area, its solvent level can still be measured, but it would need to be carefully correlated with reservoir geometry for volume calculations.

$$Z_1 = Z_0 + \frac{(P_{ATM} - P_1)}{\rho g} \quad \text{Equation 1}$$

$$\frac{\Delta P_1}{\Delta t} = \frac{\rho q Q}{A} \quad \text{Equation 2}$$

Where: $Z_1$ is the level of the solvent in the reservoir;
$Z_O$ is the level of the gas inlet tube;
$P_{ATM}$ is the pressure of the gas outside the reservoir (typically atmospheric);
$P_1$ is the pressure of the gas/vapor inside the reservoir;
ρ is the solvent density;
g is the gravitational constant;
t is time;
Q is the solvent flow rate; and
A is the cross sectional area of the reservoir (assuming it is uniform).

Figure 6:
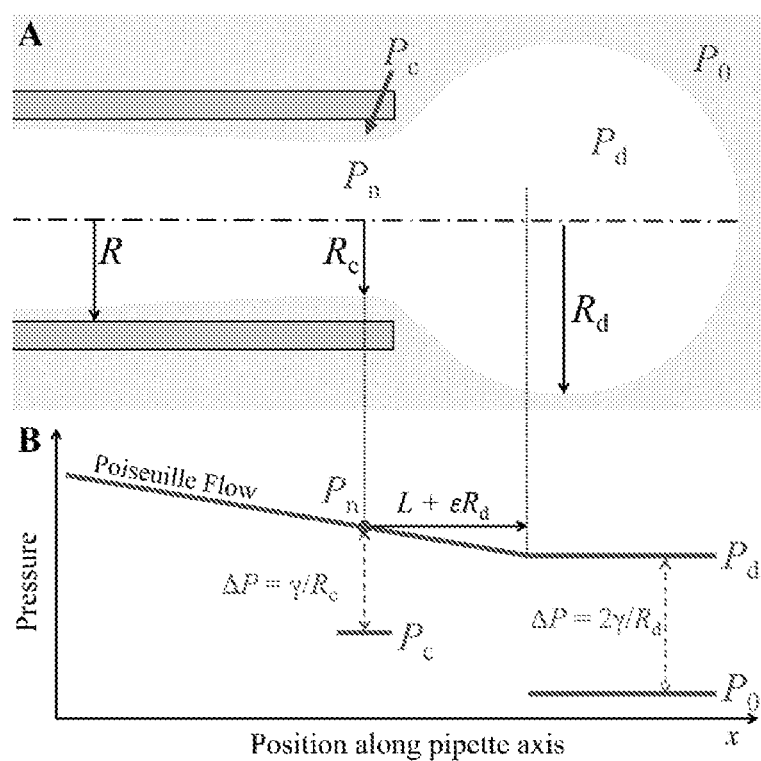
FIG. 6 is a pictorial representation of the related physics and variables for applying a correction factor.

In many cases, the pressure change due to the solvent level changing can be small enough to be on the same order of magnitude as the Laplace pressure due to the pressure difference across the bubble interface of the gas entering the bottle. In these cases, the solvent height data could be significantly offset by the Laplace pressure. As such, in some case, it is necessary to apply a Laplace pressure correction (Equation 3). FIG. 6 provides a pictorial representation of the related physics and variables for applying the correction factor. It may be possible to change the inlet tube geometry at the gas/liquid interface to mitigate the magnitude of the Laplace pressure, for example by increasing the radius at the end of the tube.

$$\Delta P = \frac{2\gamma}{r} \quad \text{Equation 3}$$

Figure 2:
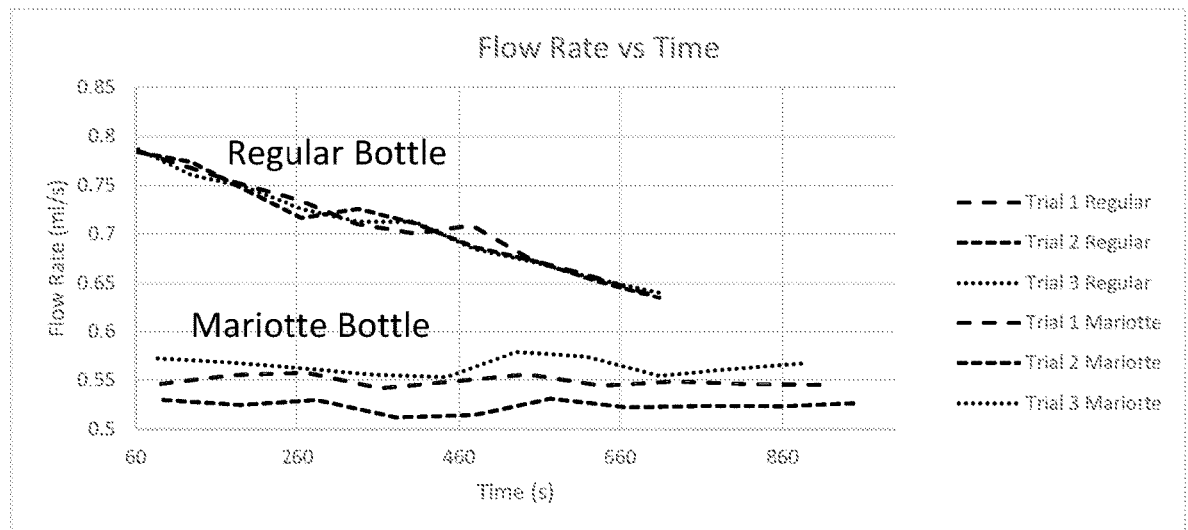
FIG. 2 is a graphical representation of a solvent flow rate vs. time for a reservoir system in accordance with one or more embodiments of the disclosure.

Where: ΔP is the pressure jump across the bubble interface;
γ is the surface tension of the liquid-gas interface;
r is the radius of the bubble (assuming a spherical bubble, one can assume r is equal to the gas inlet tube radius);

FIG. 2 is a graphical representation of a solvent flow rate vs. time for different reservoir systems. Three trials were carried out using a conventional system vs. a reservoir system in accordance with one or more embodiments of the invention. As can be seen in the graph, the flow rate of the reservoir systems in accordance with the invention maintained relatively constant flow rates, while the conventional systems suffered a significant drop off in flow rate after a relatively short period of time.

Figure 3:
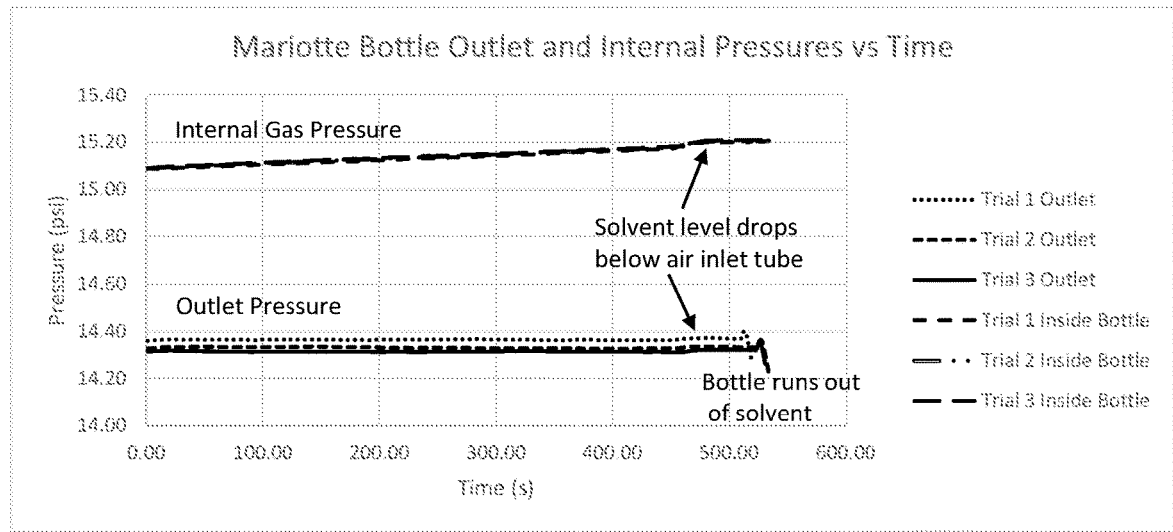
FIG. 3 is a graphical representation of an internal pressure vs. time for a reservoir system in accordance with one or more embodiments of the disclosure.

FIG. 3 is a graphical representation of an internal pressure vs. time for a reservoir system in accordance with one or more embodiments of the disclosure. Again, three trial were carried out using the inventive reservoir system. As can be seen, the internal pressure of the reservoir changes linearly, and the pressure at the outlet to the equipment is relatively constant (i.e., stable). When the solvent level falls below the gas inlet tube there is a slight disruption in the curve trends as noted on the figure, and the internal pressure returns to ambient.

Figure 4:
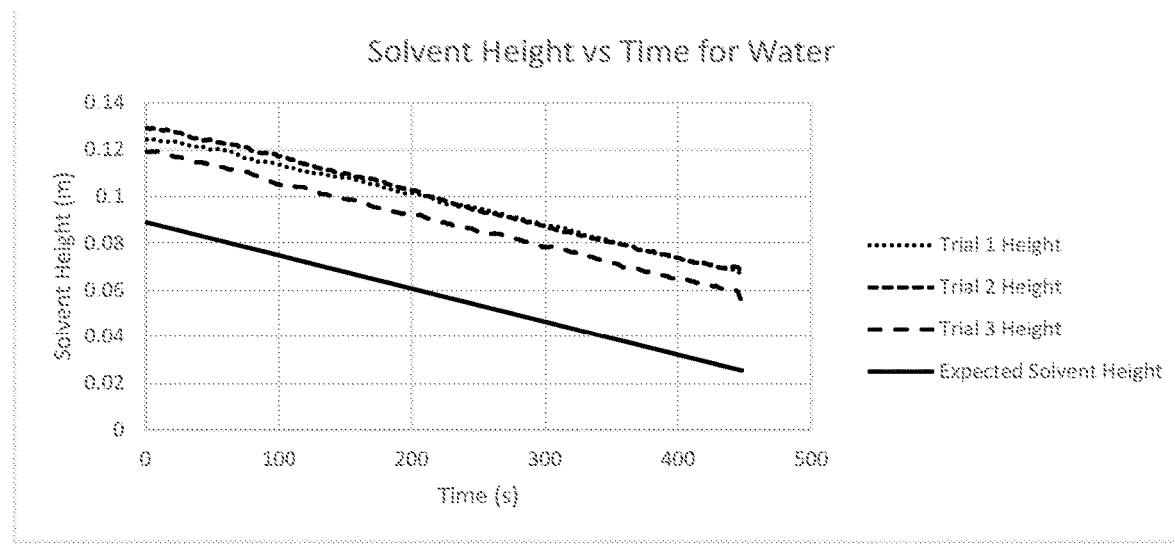
FIG. 4 is a graphical representation of a solvent level vs. time for a reservoir system without a correction factor in accordance with one or more embodiments of the disclosure.

FIG. 4 is a graphical representation of a solvent level vs. time for a reservoir system in accordance with one or more embodiments of the disclosure, where no correction factor is applied. Generally, the graph depicts the generated solvent levels over time vs. the expected solvent level over time for three trials, using water. As can be seen, the generated solvent levels tracked with the expected solvent level, but with a slight offset.

Figure 5:
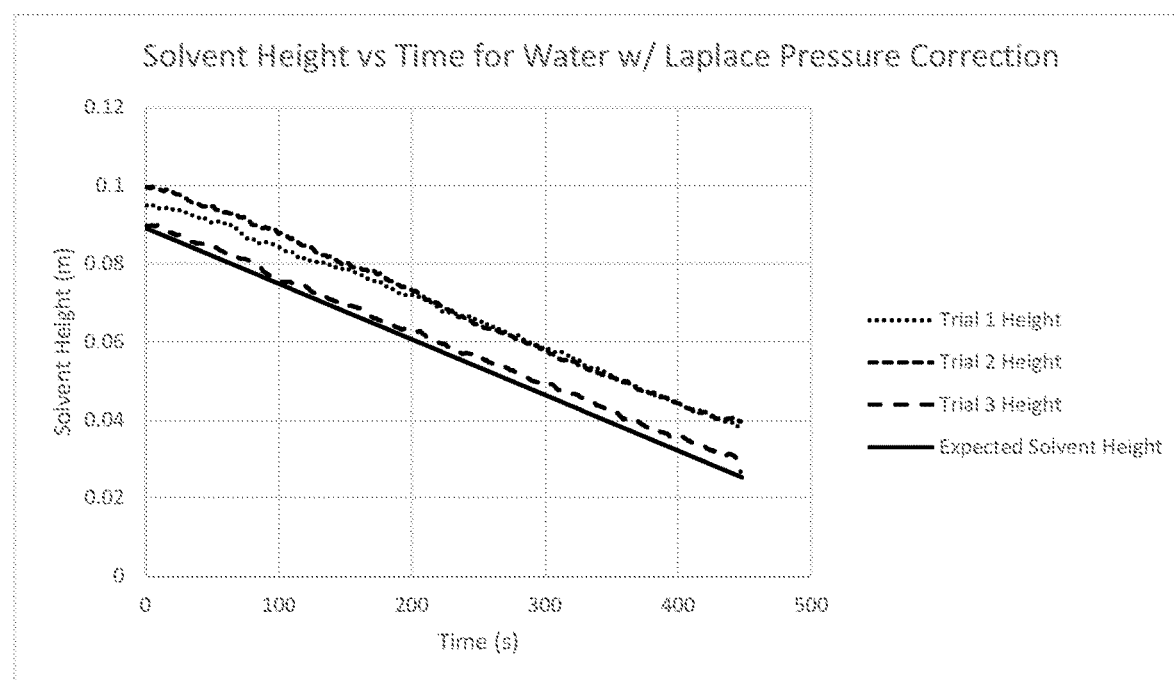
FIG. 5 is a graphical representation of a solvent level vs. time for a reservoir system with a correction factor in accordance with one or more embodiments of the disclosure.

FIG. 5 is a graphical representation of a solvent level vs. time for a reservoir system in accordance with one or more embodiments of the disclosure, where a correction factor has been applied. Similar to FIG. 4, the three generated solvent levels over time still tracked the expected solvent level, but with a significantly less offset.

In general, the word "controller" or "processor" are used herein in their broad and ordinary sense and refer, for example, to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts.

Software instructions may be embedded in firmware, such as an EPROM. It will be further appreciated that hardware modules may be comprised of connected logic units, such as gates and flip-flops, and/or may be comprised of programmable units, such as programmable gate arrays, application specific circuits, or hardware processors. The modules described herein are preferably implemented as software modules, but may be represented in hardware or firmware.

Generally, the controllers/processors described herein refer to logical modules that may be combined with other modules or divided into sub-modules despite their physical organization or storage.

The various logical blocks, modules, data structures, and processes referred to herein may be implemented or performed by a machine, such as a computer, a processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor may be a microprocessor, a controller, a microcontroller, a state machine, combinations of the same, or the like. A processor may also be implemented as a combination of computing devices, for example, a combination of a DSP and a microprocessor, a plurality of microprocessors or processor cores, one or more graphics or stream processors, one or more microprocessors in conjunction with a DSP, or any other such configuration.

The blocks or states of the processes described herein may be embodied directly in hardware or firmware, in a software module executed by a hardware processor, or in a combination of the two. For example, each of the processes described above may also be embodied in, and fully automated by, software modules executed by one or more machines such as computers or computer processors. A module may reside in a non-transitory computer-readable storage medium such as RAM memory, flash memory, ROM memory, EPROM memory, EEPROM memory, registers, a hard disk, a removable disk, an optical storage disk, memory capable of storing firmware, or any other form of computer readable storage medium. An exemplary computer-readable storage medium can be coupled to a processor such that the processor can read information from, and write information to, the computer readable storage medium. In the alternative, the computer-readable storage medium may be integral to the processor. The processor and the computer-readable storage medium may reside in an ASIC. Hardware components may communicate with other components via wired or wireless communication networks such as, e.g., the Internet, a wide area network, a local area network, or some other type of network.

Depending on the embodiment, certain acts, events, or functions of any of the processes or algorithms described herein can be performed in a different sequence, may be added, merged, or left out altogether. Thus, in certain embodiments, not all described acts or events are necessary for the practice of the processes. Moreover, in certain embodiments, acts or events may be performed concurrently, e.g., through multi-threaded processing, interrupt processing, or via multiple processors or processor cores, rather than sequentially.

Having now described some illustrative embodiments of the disclosure, it should be apparent to those skilled in the art that the foregoing is merely illustrative and not limiting, having been presented by way of example only. Numerous modifications and other embodiments are within the scope of one of ordinary skill in the art and are contemplated as falling within the scope of the disclosure. In particular, although many of the examples presented herein involve specific combinations of method acts or system elements, it should be understood that those acts and those elements may be combined in other ways to accomplish the same objectives.

Furthermore, those skilled in the art should appreciate that the parameters and configurations described herein are exemplary and that actual parameters and/or configurations will depend on the specific application in which the systems and techniques of the disclosure are used. Those skilled in the art should also recognize or be able to ascertain, using no more than routine experimentation, equivalents to the specific embodiments of the disclosure. It is, therefore, to be understood that the embodiments described herein are presented by way of example only and that, within the scope of any appended claims and equivalents thereto; the disclosure may be practiced other than as specifically described.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of" are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

What is claimed is:

1. A reservoir system for providing a solvent, the system comprising:
    a reservoir configured for holding the solvent;
    an inlet tube sealingly coupled to the reservoir;
    an outlet tube sealingly coupled to the reservoir;
    a sensor coupled to the reservoir and configured to measure a physical aspect of the reservoir system and generate a signal representative of a characteristic of the reservoir system; and
    a processor configured to process the generated signal and, in response, generate a control signal based on the characteristic of the reservoir system to at least one of provide feedback to a user or control one or more functions of the reservoir system.

2. The reservoir system of claim 1, wherein the feedback comprises at least one of a triggered alert or a generated message.

3. The reservoir system of claim 2, wherein the generated message includes at least one of an error message or a system condition, including at least one of a solvent level, a solvent density, a solvent flow rate, a system run time, or a system pressure.

4. The reservoir system of claim 1, wherein the processor configured to control one or more functions of the reservoir system is further configured to at least one of pause a laboratory process, stop a laboratory process, initiate a refill of the reservoir, regulate a pressure in the inlet tube, or alter a position of the reservoir.

5. The reservoir system of claim 1, wherein the sensor comprises at least one of a pressure sensor or a temperature sensor.

6. The reservoir system of claim 5, wherein the pressure sensor comprises one or more pressure transducers.

7. The reservoir system of claim 1, wherein the reservoir is air-tight.

8. The reservoir system of claim 1, wherein the reservoir is a Mariotte bottle.

9. The reservoir system of claim 1, further comprising a pumping system in fluid communication with the reservoir via the outlet tube.

10. The reservoir system of claim 1, wherein the inlet tube comprises an outlet port positioned proximate a bottom area of the reservoir and the inlet tube is configured to allow a gas to enter the reservoir.

11. The reservoir system of claim 1, wherein the inlet tube further comprises an inlet port, wherein the inlet port can be in fluid communication with at least one of an ambient atmosphere or a remote gas source.

12. The reservoir system of claim 9, wherein the outlet tube comprises an inlet port positioned proximate a bottom area of the reservoir and an outlet port in fluid communication with a pumping system.

* * * * *